(12) United States Patent
Hudson et al.

(10) Patent No.: US 9,017,882 B2
(45) Date of Patent: Apr. 28, 2015

(54) ELECTRODES WITH SOLID POLYMER ELECTROLYTES AND REDUCED POROSITY

(75) Inventors: William Hudson, Oakland, CA (US); Mohit Singh, Berkeley, CA (US); Michael Geier, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 967 days.

(21) Appl. No.: 13/128,234

(22) PCT Filed: Nov. 6, 2009

(86) PCT No.: PCT/US2009/063653
§ 371 (c)(1),
(2), (4) Date: Jul. 22, 2011

(87) PCT Pub. No.: WO2010/054270
PCT Pub. Date: May 14, 2010

(65) Prior Publication Data
US 2011/0281175 A1    Nov. 17, 2011

Related U.S. Application Data

(60) Provisional application No. 61/112,592, filed on Nov. 7, 2008.

(51) Int. Cl.
*H01M 10/056* (2010.01)
*H01M 4/13* (2010.01)
(Continued)

(52) U.S. Cl.
CPC ............. *H01M 10/056* (2013.01); *H01M 4/13* (2013.01); *H01M 4/485* (2013.01); *H01M 4/624* (2013.01); *H01M 10/0565* (2013.01); *Y02E 60/122* (2013.01)

(58) Field of Classification Search
CPC ............ H01M 4/0404; H01M 4/0414; H01M 4/36–4/366; H01M 4/02; H01M 4/13; H01M 4/0485; H01M 4/485; H01M 4/624; H01M 10/056; H01M 10/0565
See application file for complete search history.

(56) References Cited

U.S. PATENT DOCUMENTS 4,812,375 A    3/1989    Foster
4,879,190 A    11/1989    Lundsgaard (Continued)

FOREIGN PATENT DOCUMENTS

WO    03012909 A1    2/2003

*Primary Examiner* — Alix Eggerding
(74) *Attorney, Agent, or Firm* — R'Sue Popowich Caron

(57) ABSTRACT

An electrode/electrolyte assembly that has a well-integrated interface between an electrode and a solid polymer electrolyte film, which provides continuous, ionically-conducting and electronically insulating paths between the films is provided. A slurry is made containing active electrolyte material, a liquefied, ionically-conductive first polymer electrolyte with dissolved lithium salt, and conductive additive. The binder may have been liquefied by dissolving in a volatile solvent or by melting. The slurry is cast or extruded as a thin film and dried or cooled to form an electrode layer that has some inherent porosity. A liquefied second polymer electrolyte that includes a salt is cast over the electrode film. Some of the liquefied second polymer electrolyte fills at least some of the pores in the electrode film and the rest forms an electrolyte layer on top of the electrode film. After solidifying by either drying or cooling, the dual-cast electrode assembly includes both an electrode with low porosity and an adjacent solid polymer electrolyte film. A lithium secondary battery that employs the novel electrode assembly is also provided.

26 Claims, 8 Drawing Sheets

(51) Int. Cl.
*H01M 4/485* (2010.01)
*H01M 4/62* (2006.01)
*H01M 10/0565* (2010.01)

(56) References Cited

U.S. PATENT DOCUMENTS

| | | | |
|---|---|---|---|
| 4,925,751 A | 5/1990 | Shackle | |
| 5,013,619 A | 5/1991 | Cook | |
| 5,354,631 A | 10/1994 | Chaloner-Gill | |
| 5,453,101 A | 9/1995 | Ong | |
| 5,643,665 A | 7/1997 | Saidi | |
| 5,648,187 A | 7/1997 | Skotheim | |
| 6,025,094 A | 2/2000 | Visco | |
| 6,565,763 B1 | 5/2003 | Asakawa | |
| 6,743,550 B2 | 6/2004 | Gan | |
| 6,828,056 B2 | 12/2004 | Molter | |
| 7,026,071 B2 | 4/2006 | Mayes | |
| 7,282,302 B2 | 10/2007 | Visco | |
| 7,318,982 B2 | 1/2008 | Gozdz | |
| 2004/0013814 A1 | 1/2004 | Guerfi | |
| 2004/0029010 A1* | 2/2004 | Sada et al. | 429/231.4 |
| 2004/0122178 A1* | 6/2004 | Huang et al. | 525/221 |
| 2004/0157130 A1* | 8/2004 | Ohsawa et al. | 429/303 |
| 2006/0166093 A1 | 7/2006 | Zaghib | |
| 2006/0228631 A1* | 10/2006 | Miura et al. | 429/232 |
| 2006/0270822 A1 | 11/2006 | Norsten | |
| 2007/0154805 A1 | 7/2007 | Zaghib | |
| 2007/0238000 A1* | 10/2007 | Koyama et al. | 429/33 |
| 2008/0138683 A1 | 6/2008 | Yoshikawa | |
| 2010/0104948 A1 | 4/2010 | Skotheim | |

\* cited by examiner

ELECTRODES WITH SOLID POLYMER ELECTROLYTES AND REDUCED POROSITY

CROSS-REFERENCE TO RELATED APPLICATIONS

This application claims priority to U.S. Provisional Patent Application 61/112,592, filed Nov. 7, 2008 and to International Application No. PCT/US09/63653 filed Nov. 6, 2009, both of which are incorporated by reference herein. This application is also related to copending International Application No. PCT/US09/63643 filed Nov. 6, 2009 and to copending International Application No. PCT/US09/63655 filed Nov. 6, 2009, both of which are incorporated by reference herein.

BACKGROUND OF THE INVENTION

Field of the Invention

This invention relates generally to electrodes in electrochemical cells, and, more specifically, to reduced porosity electrodes that employ solid polymer electrolytes.

It is difficult to control porosity when casting or extruding electrode films. Some porosity may be desired in some cases, but uncontrolled or unpredictable porosity is never desirable. For electrodes that employ liquid electrolytes, pores are essential, as they provide paths for the liquid electrolytes to fill and thereby establish ionic communication with the electrode active material. However, in solid polymer electrolyte systems, any porosity remaining in the electrode is void space that reduces both the energy density of the electrode and the facility of charge transfer between the electrode and electrolyte. Casting or extruding conditions can be adjusted to minimize the void space, but even so, in both solid and liquid electrolyte cells, it is often necessary to calender the films in a post-casting step to reduce or eliminate the void space.

After the electrode films are formed, an electrochemical cell stack is made by placing a separately-processed electrolyte film between the anode film and cathode film and them laminating them together. This process step presents a significant challenge because proper alignment of the three discreet thin films and complete lamination at the interfaces, particularly in all-solid-state systems are crucial to good cell performance.

It would be useful to have an electrode/electrolyte assembly that has controlled porosity with good layer alignment and interface integration in order to overcome physical barriers to ionic conduction within and across through the layers. An electrochemical cell made with such electrode/electrolyte assemblies can make significant gains in performance.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
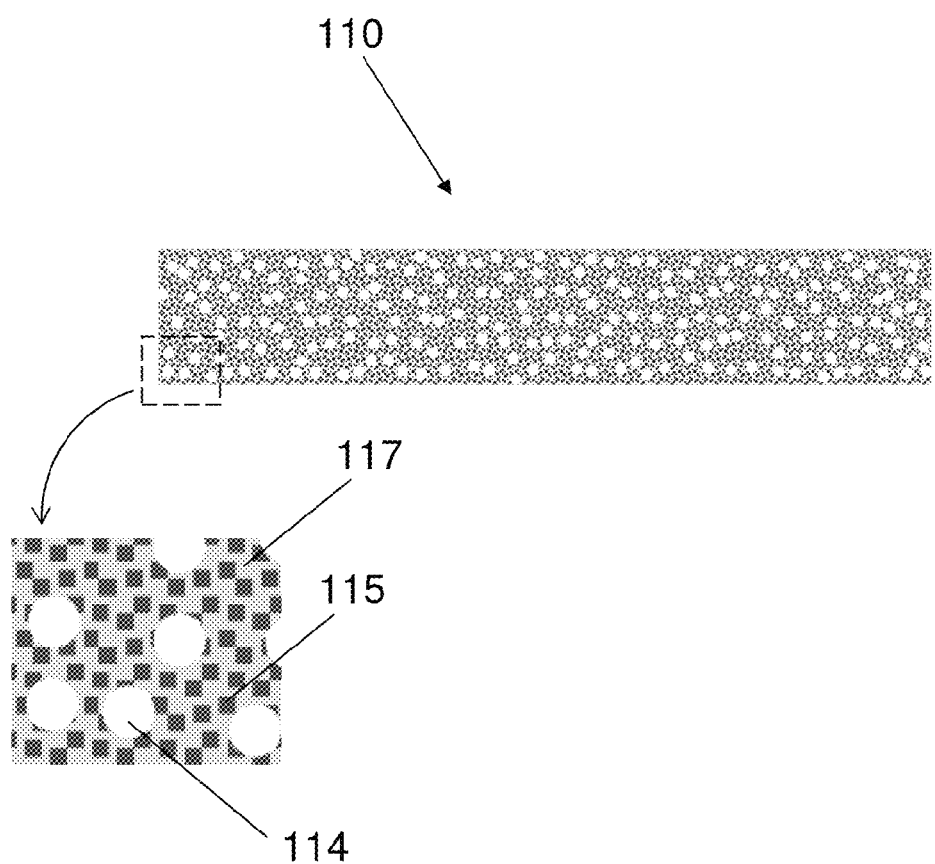
FIG. 1 is a schematic cross-section illustration of an electrode layer, according to an exemplary embodiment.

The preferred embodiments are illustrated in the context of electrodes in an electrochemical cell. The skilled artisan will readily appreciate, however, that the materials and methods disclosed herein will have application in a number of other contexts where layering of electrode and electrolyte materials is desirable, particularly where good ionic and/or electronic contact is important.

These and other objects and advantages of the present invention will become more fully apparent from the following description taken in conjunction with the accompanying drawings.

In this disclosure, the terms "negative electrode" and "anode" are both used to mean "negative electrode." Likewise, the terms "positive electrode" and "cathode" are both used to mean "positive electrode."

It is to be understood that the term "liquefied solid," as used herein in reference to electrolytes, is meant to denote a liquid form of a solid electrolyte wherein the liquid has been formed either through dissolution in a solvent or through melting. The "liquefied solid" is allowed to solidify by drying or cooling before an electrochemical cell is charged or discharged. Thus, when used in the cell, the electrolyte is a solid electrolyte. This term is used to distinguish such an electrolyte from commonly known liquid electrolytes, which participate in the electrochemical reactions of a cell in their liquid form. In some embodiments of the invention, the solid electrolyte has at least some cross-linking. In other embodiments of the invention, the solid electrolyte has no cross-linking.

In accordance with an aspect of the present invention, an electrode/electrolyte assembly that has a well-integrated interface between an electrode and a solid polymer electrolyte film, providing continuous, ionically-conducting and electronically insulating paths between the films is provided.

In accordance with another aspect of the present invention, a lithium secondary battery that employs the novel anode is provided.

A slurry is made containing active electrolyte material, a liquefied, ionically conductive polymer electrolyte with dissolved lithium salt, and conductive additive. The binder may have been liquefied by dissolving in a volatile solvent or by melting. The slurry is cast or extruded as a thin film and dried or cooled to form an electrode layer that has some inherent porosity. In some arrangements, the electrode is then calendered to reduce the porosity. A liquefied polymer electrolyte that includes a salt is cast over the electrode film. Some of the liquefied polymer electrolyte fills at least some of the pores in the electrode film and the rest forms an electrolyte layer on top of the electrode film. After solidifying by either drying or cooling, the dual-cast electrode assembly includes both an electrode with low porosity and an adjacent solid polymer electrolyte film. There is a well-integrated interface between the electrode and the solid polymer electrolyte film, providing continuous, ionically-conducting and electronically insulating path between the films.

If it is desirable to retain electrode porosity, the viscosity of the liquefied polymer electrolyte is increased so that the liquefied electrolyte is unable to fill the pores, yet can still form an electrode assembly that has an electrolyte film adjacent an electrode film. A complete cell can be fabricated by laminating two such electrode assemblies together with electrolyte films facing one another or by laminating the electrolyte side of an electrode assembly with a second electrode film. Thus there is only one laminated interface in the cell. In one arrangement, a second electrode can be cast directly onto the electrode assembly to obtain a complete cell without any lamination step.

A more detailed description of ways to form these structures can be found in copending U.S. Provisional Patent Application 61/112,596 METHOD OF FORMING AN ELECTRODE ASSEMBLY, filed Nov. 7, 2008, which is incorporated by reference herein.

FIG. 1 shows a schematic cross-section illustration of an electrode layer 110, according to an exemplary embodiment. The electrode layer 110 includes active material particles 115, a binder 117, and pores 114. In some arrangements, the electrode 110 also includes electronically conductive particles (not shown). In this example, the binder 117 is a solid polymer electrolyte and serves two functions in the electrode layer 110. The binder 117 acts as the electrolyte for the electrode, and it holds together the active and optional electronically conductive particles, dispersing them within the electrode and maintaining film integrity. The solid polymer electrolyte/binder can also contain a dissolved lithium salt. One example of a useful lithium salt is lithium bis-trifluoromethanesulfonimide. Non-lithium salts such as other alkali metal salts or salts of aluminum, sodium, or magnesium can also be used.

In one arrangement, the active material particles 115 are cathode (>3V vs Li/Li+) intercalation compounds. Examples of active materials that can be used for the cathode include, but are not limited to those having the general formula $Li_xA_{1-y}M_yO_2$, wherein A includes at least one transition element such as Mn, Co, and Ni; M includes at least one element such as B, Mg, Ca, Sr, Ba, Ti, V, Cr, Mn, Fe, Co, Ni, Cu, Al, In, Nb, Mo, W, Y, and Rh; x ranges between $0.05 \leq x \leq 1.1$; and y ranges between $0 \leq y \leq 0.5$. Examples of yet other active materials that can be used for the cathode include, but are not limited to those having the general formula $Li_x(Fe_yM_{1-y})PO_4$, wherein M includes at least one transition element such as Mn, Co and Ni; x ranges between $0.9 \leq x \leq 1.1$; and y ranges between $0 \leq y \leq 1$.

In another arrangement, the active material particles 115 are anode (<2V vs Li/Li+) intercalation compounds. Examples of active materials that can be used for the anode include, but are not limited to graphite, metals, alloys, or metal oxides, which can form well-defined intermetallic/intercalation phases with lithium. Examples of appropriate materials include, but are not limited to, metals such as aluminum (Al), silicon (Si), germanium (Ge), tin (Sn), lead (Pb), antimony (Sb), magnesium (Mg); Si alloys with elements such as tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), chromium (Cr), and their alloys and oxides; carbon and silicon carbides; alloys such as Cu—Sn, Sb—Sn; and lithium or lithium-rich alloys such as Li—Al, Li—Si, Li—Sn, Li—Hg, Li—Zn, Li—Pb, and Li—C.

Usually, as a result of the way in which active material particles and additive particles arrange themselves in a polymer matrix, the electrode film solidifies with some porosity. Such electrode films often have between about 50% and 1% porosity by volume. In one arrangement, the electrode films have a porosity of about 10% by volume. In another arrangement, the electrode films have a porosity of about 5% by volume. In yet another arrangement, the electrode films have a porosity of about 1% by volume. While such porosity is desirable in a liquid electrolyte system where the pores are used to provide space for the liquid electrolyte to fill, it can be an impediment to performance in solid-state battery systems. In most arrangements, open pores unnecessarily increase the electrode volume and hinder high-rate capability because the binder itself is the electrolyte. The pore space is dead volume that is not involved in transporting charge to and from the active material particles. In other arrangements, porosity in the electrode film may be desirable so that it can accommodate volume changes in the active material particles upon $Li^+$ insertion/extraction. In one arrangement, the electrode film has a thickness between about 5 and 40 µm.

In accordance with one aspect of the present invention, a reduced-porosity electrode is provided. The porosity is reduced through a novel way of filling the pores with a dissolved or melted polymer electrolyte that is cast onto the electrode after the electrode film has been made. By using a polymer which is also a good solid electrolyte, the casting fulfills the added purpose of integrating the electrode and electrolyte-separator into a single film, meeting the significant challenge of achieving a continuous interface between the two solid material layers.

Figure 2A:
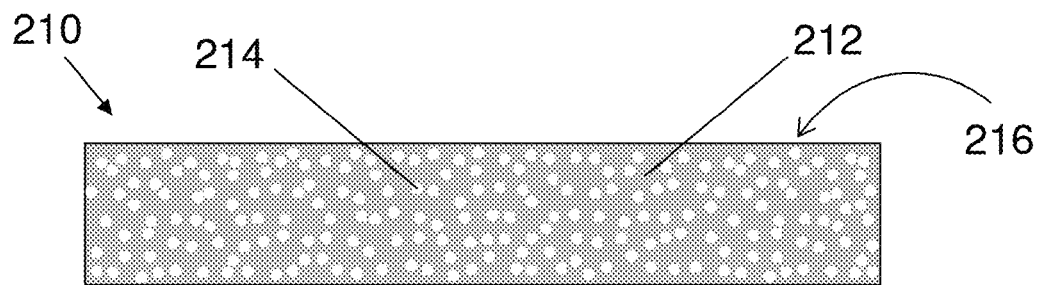
FIGS. 2*a*-2*c* are schematic cross-section illustrations that show an electrode assembly at various processing stages, according to an embodiment of the invention.
Figure 2B:
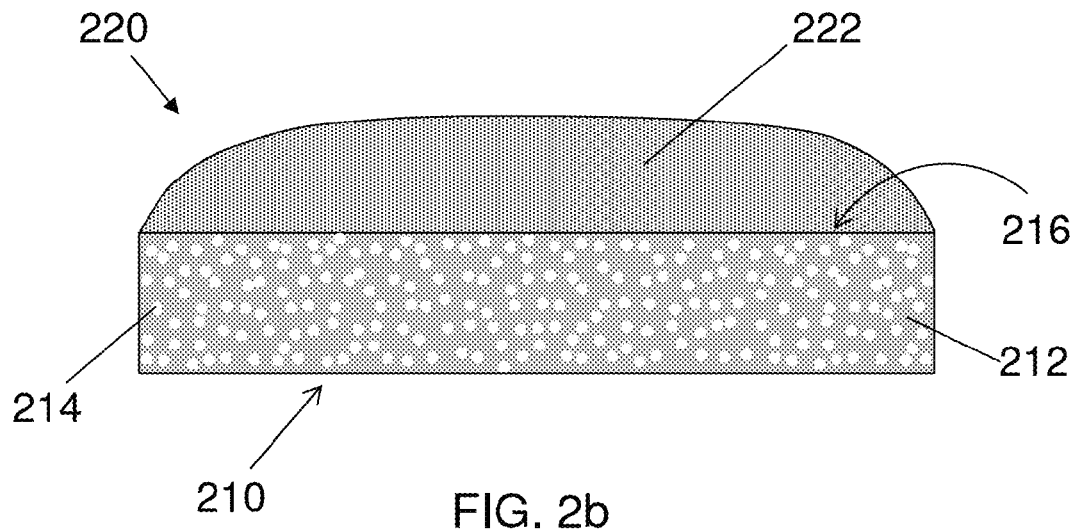
Figure 2C:
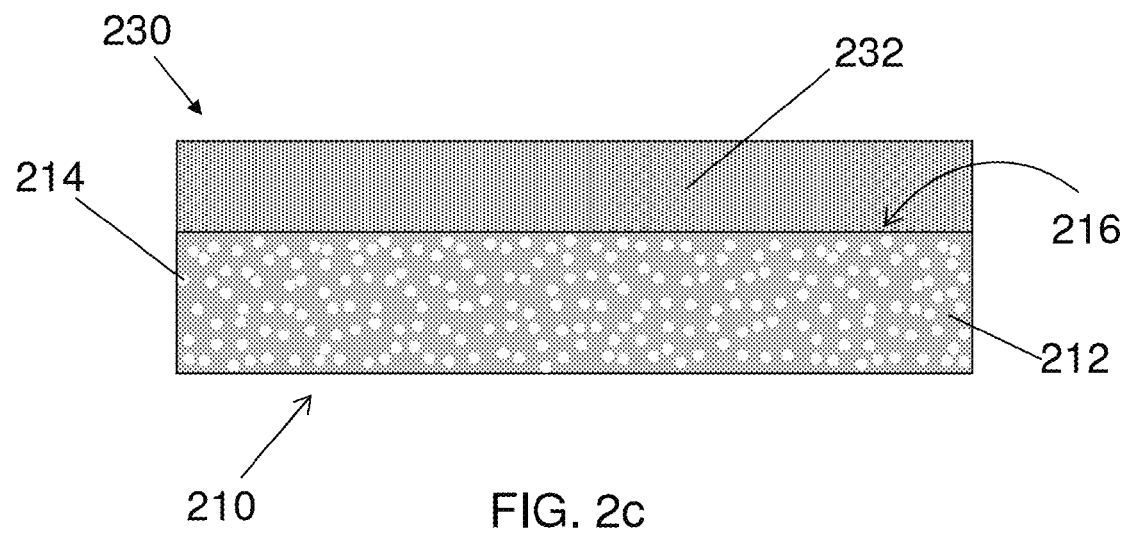

FIGS. 2a-2c are schematic cross-section illustrations that show an electrode assembly at various processing stages, according to an embodiment of the invention. In FIG. 2a, an electrode 210 is formed. In one arrangement, the electrode 210 is formed by casting. In another arrangement, the electrode 210 is formed by extrusion. Any appropriate method can be used to form the electrode 210. In FIG. 2a, individual active material particles and solid polymer electrolyte are not shown separately. Instead a composite 212 of a first solid polymer electrolyte and active material particles is indicated. In some arrangements, the composite 212 can also include electronically conductive particles, such as carbon particles. There are pores 214 throughout the composite 212. The pores 214 may be artifacts of the electrode 210 formation. Pores are not always desirable in an electrode, especially when the electrode uses electrode active materials that do not expand and contract significantly upon absorption and release of lithium. The electrode 210 can be pressed or calendered to reduce the size and/or number of the pores 214.

In FIG. 2b, a liquefied second polymer electrolyte 222 is spread on at least one surface 216 of the electrode 210 to form a structure 220. It is especially useful if the liquefied second polymer electrolyte 222 is a solid at normal electrochemical cell operating temperatures and has been liquefied either by melting or by dissolution in a volatile solvent. In FIG. 2, penetration of the electrolyte 222 into the electrode 210 has been avoided by using a liquefied electrolyte 222 with a high viscosity. The viscosity of the polymer electrolyte 222 can be controlled by the solvent concentration and/or by temperature. The polymer electrolyte 222 is too viscous to penetrate into the electrode 210, but still forms a good, ionically-conductive contact with the electrode 210.

In some arrangements, the liquefied second polymer electrolyte 222 can also dissolve or melt the surface 216 of the electrode 210, resulting in intermixing of the second polymer electrolyte 222 and the first polymer electrolyte and active material particles 212 at the surface 216 of the electrode 210. In other arrangements, the electrode film 210 is unaffected by the liquefied second polymer electrolyte 222, and no intermixing occurs. Dissolution of the electrode film 210 can be mitigated or avoided by using a solvent for the liquefied second electrolyte 222 that does not readily dissolve the first polymer electrolyte in the composite 212 or by promoting very fast drying of the liquefied second electrolyte 222. Melting of the electrode film 210 can be avoided by keeping the liquefied second polymer electrolyte 222 at a temperature below the melting point of the electrode film 210 or by cooling the electrode film 210 as the liquefied second polymer electrolyte 222 is spread.

FIG. 2c shows an electrode assembly 230 that has been made from the structure shown in FIG. 2b. The liquefied second polymer electrolyte 222 has solidified, either by drying or cooling, to become a second solid polymer electrolyte layer 232 in intimate contact with the surface 216. The contact between the second solid polymer electrolyte layer 232 and the electrode layer 210 allows easy transport of ions between the layers 210, 232. In one arrangement, the second solid polymer electrolyte film 232 has a thickness between about 5 and 40 µm. Such an electrode assembly 230 includes several component layers (i.e., electrode, separator, and electrolyte) with excellent and uniform surface contact between the layers.

Figure 3A:
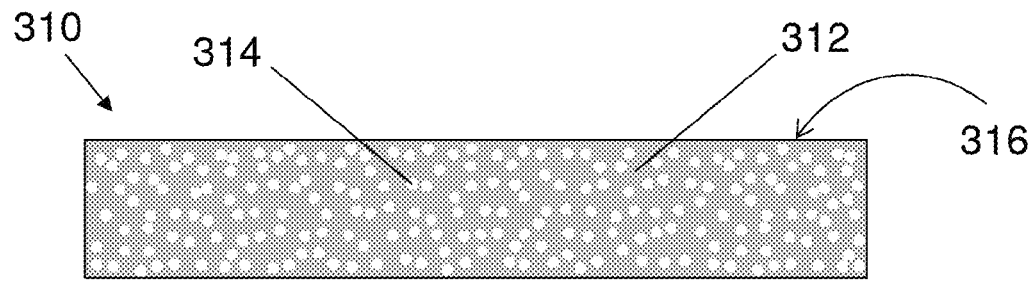
FIGS. 3*a*-3*c* are schematic cross-section illustrations that show an electrode assembly at various processing stages, according to another embodiment of the invention.
Figure 3B:
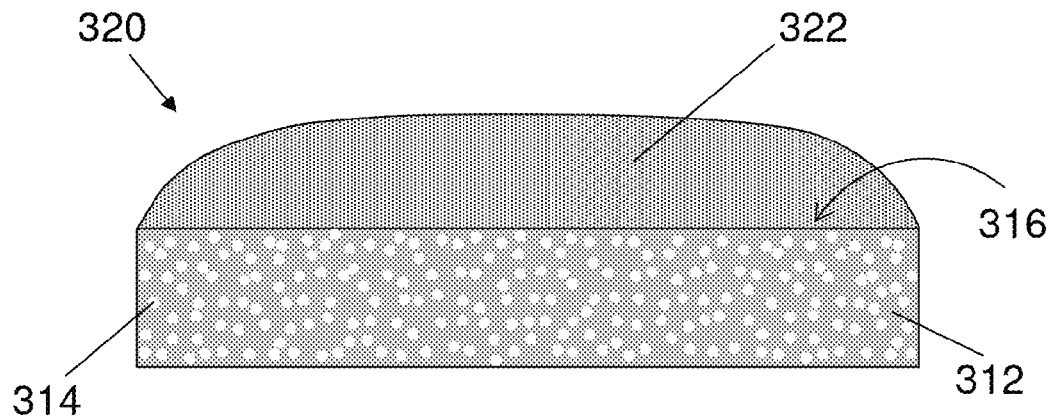
Figure 3C:
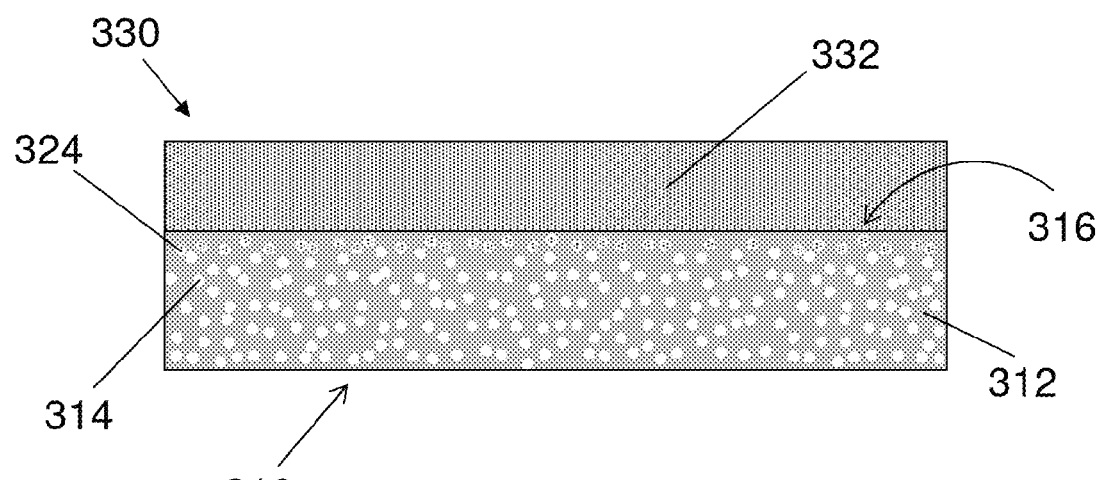

FIGS. 3a-3c are schematic cross-section illustrations that show an electrode assembly at various processing stages, according to an embodiment of the invention. In FIG. 3a, an electrode 310 is formed. In one arrangement, the electrode 310 is formed by casting. In another arrangement, the electrode 310 is formed by extrusion. Any appropriate method can be used to form the electrode 310. In FIG. 3a, individual active material particles and solid polymer electrolyte are not shown separately. Instead a composite 312 of a first solid polymer electrolyte and active material particles is indicated. In some arrangements, the composite 312 can also include electronically conductive particles, such as carbon particles. There are pores 314 throughout the composite 312. The pores 314 may be artifacts of the electrode 310 formation. Pores are not always desirable in an electrode, especially when the electrode uses active material particles that do not expand and contract significantly upon absorption and release of lithium. The electrode 310 can be pressed or calendered to reduce the size and/or number of the pores 314.

In FIG. 3b, a liquefied second polymer electrolyte 322 is spread on at least one surface 316 of the electrode 310 to form a structure 320. It is especially useful if the liquefied second polymer electrolyte 322 is a solid at normal electrochemical cell operating temperatures and has been liquefied either by melting or by dissolution in a volatile solvent. The viscosity of the liquefied second polymer electrolyte 322 can be controlled by solvent concentration and/or by temperature. If the viscosity of the second polymer electrolyte 322 is low enough, it can penetrate into the electrode 310, filling at least a portion of the pores 314. In some arrangements, the second polymer electrolyte 322 can be dissolved in a solvent in a weight fraction of between 5 and 20% solute. Any liquefied second polymer electrolyte 322 that has not been absorbed into the electrode 310 settles on the surface 316 of the electrode 310 and dries to form a coherent and continuous solid second polymer electrolyte film 332.

In some arrangements, the liquefied second polymer electrolyte 322 can also dissolve or melt the surface 316 of the electrode 310, resulting in intermixing of the second polymer electrolyte 322 and the first polymer electrolyte and active material particles at the surface 316 of the electrode 310. In other arrangements, the electrode film 310 is unaffected by the liquefied second polymer electrolyte 322, and no intermixing occurs. Dissolution can be mitigated or avoided by using a solvent for the liquefied second electrolyte 322 that does not readily dissolve the first polymer electrolyte or by promoting very fast drying of the liquefied second electrolyte 322. Melting can be avoided by keeping the liquefied second polymer electrolyte 322 at a temperature below the melting point of the electrode film 310 or by cooling the electrode film 310 as the liquefied second polymer electrolyte 322 is spread.

FIG. 3c shows an electrode assembly 330 that formed from the structure 320 shown in FIG. 3b. The liquefied second polymer electrolyte 322 has penetrated partially through the electrode 310, filling only pores 314 near the surface 316. Thus some pores 314 have become small pockets 324 of second polymer electrolyte within the composite 312 of the first solid polymer electrolyte and active material particles. The liquefied second polymer electrolyte 322 has solidified, either by drying or cooling, into a second solid polymer electrolyte layer 332 in intimate contact with the surface 316. The partial penetration of the solid polymer electrolyte 332 may be helpful in ensuring very good contact between the second solid polymer electrolyte layer 332 and the electrode 310. The contact between the second solid polymer electrolyte layer 332 and the electrode layer 310 allows easy transport of ions between the layers. In one arrangement, the second solid polymer electrolyte film 332 has a thickness between about 5 and 40 µm. Such an electrode assembly 330 includes several component layers (i.e., electrode, separator, and electrolyte) with excellent and uniform surface contact between the layers.

Figure 4A:
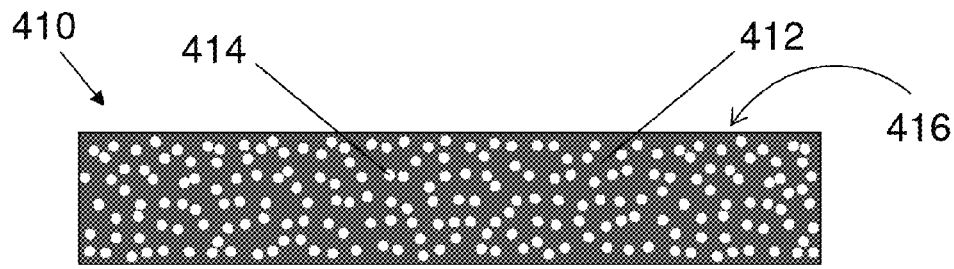
FIGS. 4*a*-4*c* are schematic cross-section illustrations that show an electrode assembly at various processing stages, according to another embodiment of the invention.
Figure 4B:
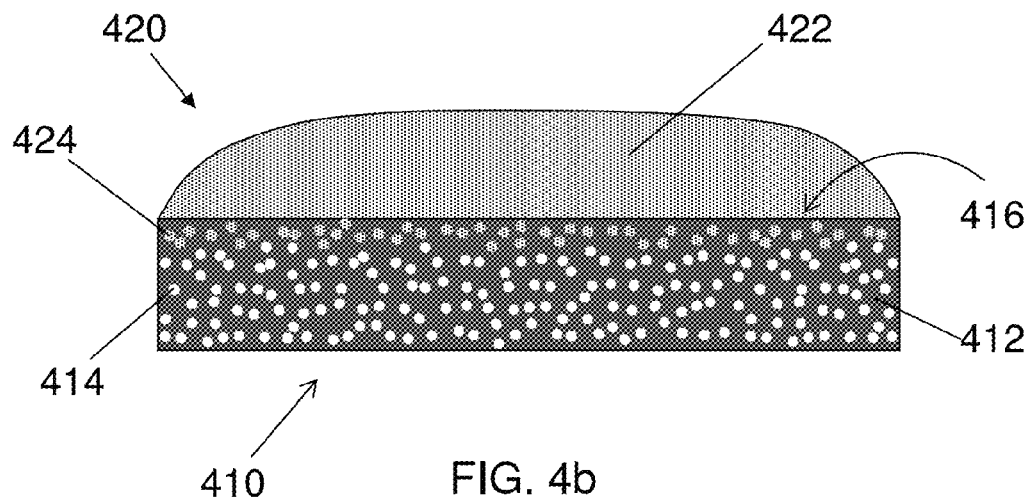
Figure 4C:
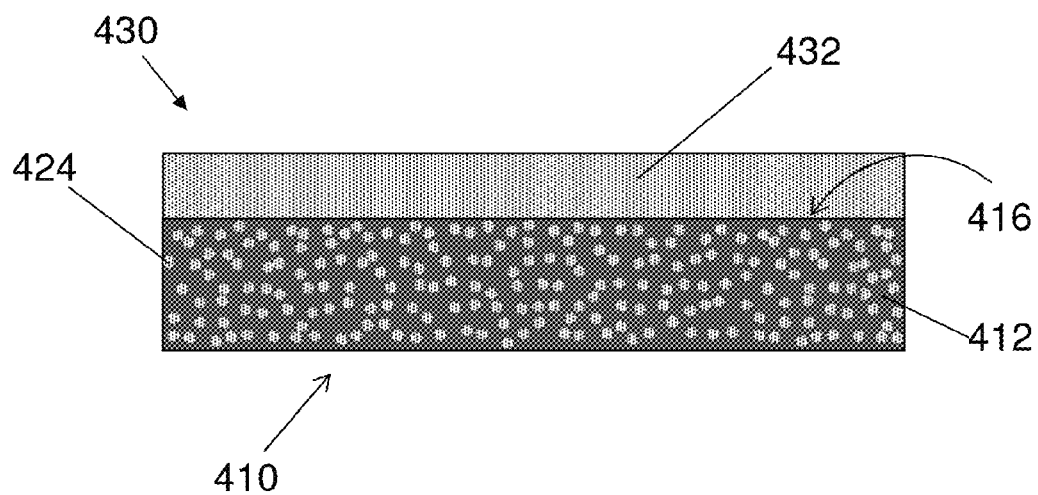

FIGS. 4a-4c are schematic cross-section illustrations that show an electrode assembly at various processing stages, according to an embodiment of the invention. In FIG. 4a, an electrode 410 is formed. In one arrangement, the electrode 410 is formed by casting. In another arrangement, the electrode 410 is formed by extrusion. Any appropriate method can be used to form the electrode 410. In FIG. 4a, individual active material particles and solid polymer electrolyte are not shown separately. Instead a composite 412 of a first solid polymer electrolyte and active material particles is indicated. In some arrangements, the composite 412 can also include electronically conductive particles, such as carbon particles. There are pores 414 throughout the composite 412. The pores 414 may be artifacts of the electrode 410 formation. Pores are not always desirable in an electrode, especially when the electrode uses electrode active materials that do not expand and contract significantly upon absorption and release of lithium. The electrode 410 can be pressed or calendered to reduce the size and/or number of the pores 414.

In FIG. 4b, a liquefied second polymer electrolyte 422 has been spread on at least one surface 416 of the electrode 410 to form a structure 420. It is especially useful if the liquefied second polymer electrolyte 422 is a solid at normal electrochemical cell operating temperatures and has been liquefied either by melting or by dissolution in a volatile solvent. The viscosity of the liquefied second polymer electrolyte 422 can be controlled by solvent concentration and/or by temperature. If the viscosity of the liquefied second polymer electrolyte 422 is low enough, it can penetrate into the electrode 410, filling at least a portion of the pores 414. In some arrangements, the second polymer electrolyte 422 can be dissolved in a solvent in a weight fraction of between 5 and 20% solute. Any liquefied second polymer electrolyte 422 that has not been absorbed into the electrode 410 settles on the surface 416 of the electrode 410 and dries to form a coherent and continuous solid second polymer electrolyte film 432.

In some arrangements, the liquefied second polymer electrolyte 422 can also dissolve or melt the surface 416 of the electrode 410, resulting in intermixing of the liquefied second polymer electrolyte 422 and the first polymer electrolyte and active material particles at the surface 416 of the electrode 410. In other arrangements, the electrode film 410 is unaffected by the liquefied second polymer electrolyte 422, and no intermixing occurs. Dissolution can be mitigated or avoided by using a solvent for the liquefied second electrolyte 422 that does not readily dissolve the first polymer electrolyte in the composite 412 or by promoting very fast drying of the liquefied second polymer electrolyte 422. Melting can be avoided by keeping the liquefied second electrolyte 422 at a temperature below the melting point of the electrode film 410 or by cooling the electrode film 410 as the liquefied second polymer electrolyte 422 is spread.

FIG. 4c shows an electrode assembly 430 that has formed from the structure 420 shown in FIG. 4b. The liquefied second solid polymer electrolyte 422 has penetrated completely, or nearly so, through the electrode 410, filling a major portion of the pores 414. The pores 414 have become small pockets 424 of second polymer electrolyte within the composite 412 of the first solid polymer electrolyte and active material particles. The liquefied second polymer electrolyte 422 has solidified, either by drying or cooling, into a second solid polymer electrolyte layer 432 in intimate contact with the surface 416. The contact between the second solid polymer electrolyte layer 432 and the electrode layer 410 allows easy transport of ions between the layers. In one arrangement, the solid second polymer electrolyte film 432 has a thickness between about 5 and 40 μm. Such an electrode assembly 430 includes several component layers (i.e., electrode, separator, and electrolyte) with excellent and uniform surface contact between the layers.

Figure 5:
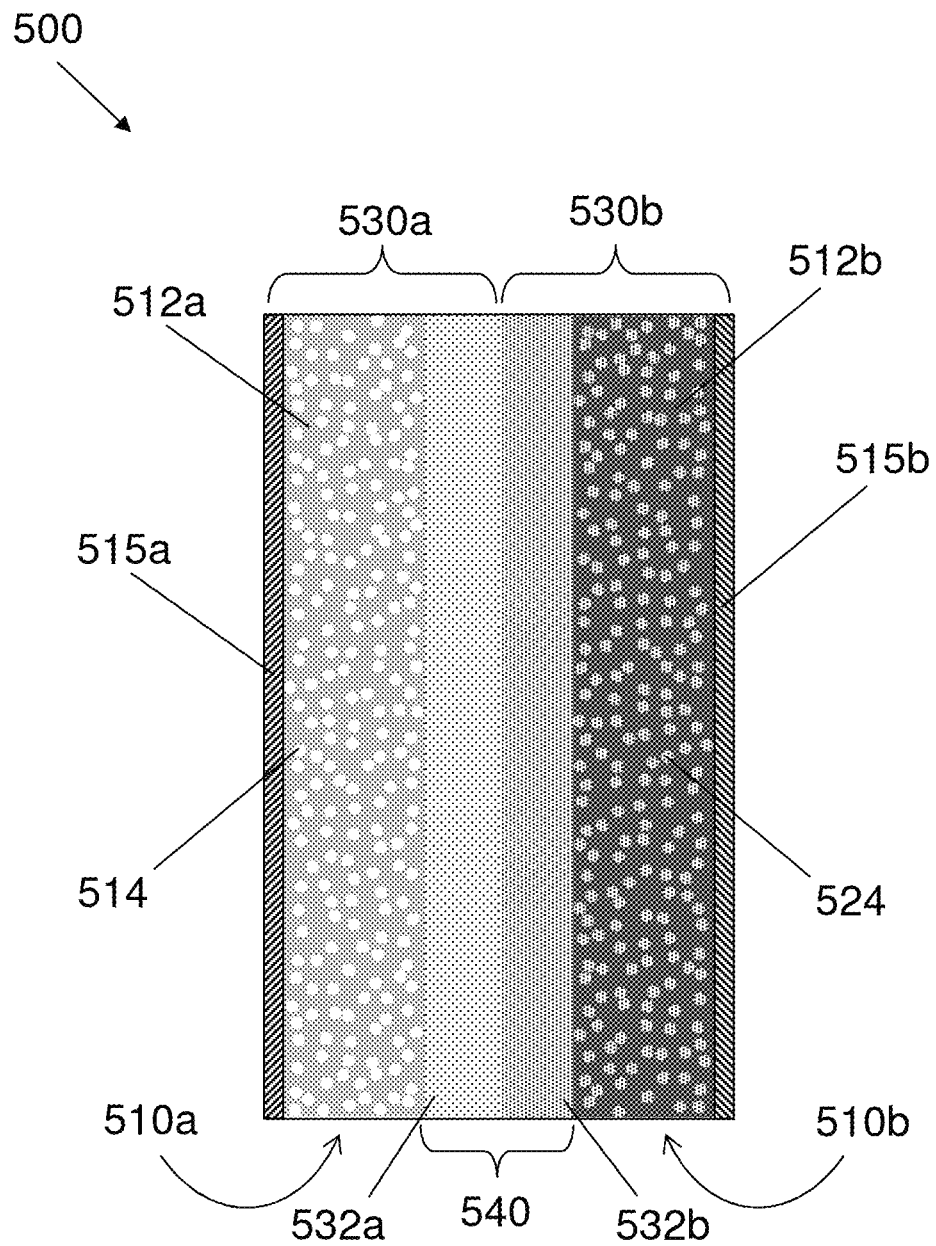
FIG. 5 is a schematic cross-section of an electrochemical cell, according to an embodiment of the invention.

FIG. 5 is a schematic cross-section of an electrochemical cell 500, according to an embodiment of the invention. The cell 500 has an anode assembly 530a and a cathode assembly 530b. The anode assembly 530a includes an anode 510a, an anode second electrolyte film 532a, and an optional current collector 515a. The anode assembly 530a is like the anode assembly 230 show in FIG. 2c, but other electrode assembly configurations can also be used. The cathode assembly 530b includes a cathode 510b, a cathode second electrolyte film 532b, and an optional current collector 515b. The cathode assembly 530b is like the cathode assembly 430 show in FIG. 4c, but other electrode assembly configurations can also be used. The anode assembly 530a and the cathode assembly 530b have been placed next to each other with the second electrolyte films 532a, 532b in contact. Together the second electrolyte films 532a, 532b form a separator layer 540 between the anode 512a and the cathode 512b. In other arrangements, there can be an additional electrolyte layer (not shown) between the anode assembly 530a and the cathode assembly 530b. In yet other arrangements, a cell is formed with a dual-layer anode (cathode) assembly that acts as both anode (cathode) and separator and a single-layer cathode (anode).

In another embodiment of the invention, a second electrolyte film can be cast on a different substrate or extruded and then dried. The second solid electrolyte film can then be laminated directly onto an electrode such as electrode 110 shown in FIG. 1 to form a first electrode assembly. A second electrode assembly can be formed in a similar way. The cell can be fabricated by laminating the two electrode films together, or by laminating together the two electrode films and an electrolyte film sandwiched in between.

Electrolytes

There are a variety of polymer electrolytes that are appropriate for use in the inventive structures described herein. In one embodiment of the invention, an electrolyte contains one or more of the following optionally cross-linked polymers: polyethylene oxide, polysulfone, polyacrylonitrile, siloxane, polyether, polyamine, linear copolymers containing ethers or amines, ethylene carbonate, Nafion®, and polysiloxane grafted with small molecules or oligomers that include polyethers and/or alkylcarbonates.

As described in detail above, a block copolymer electrolyte can be used in the embodiments of the invention.

Figure 6A:
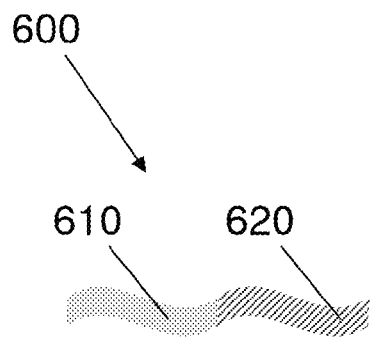
FIG. 6 is a schematic drawing of a diblock copolymer electrolyte and a domain structure it can form.

FIG. 6A is a simplified illustration of an exemplary diblock polymer molecule 600 that has a first polymer block 610 and a second polymer block 620 covalently bonded together. In one arrangement both the first polymer block 610 and the second polymer block 620 are linear polymer blocks. In another arrangement, either one or both polymer blocks 610, 620 has a comb (or branched) structure. In one arrangement, neither polymer block is cross-linked. In another arrangement, one polymer block is cross-linked. In yet another arrangement, both polymer blocks are cross-linked.

Figure 6B:
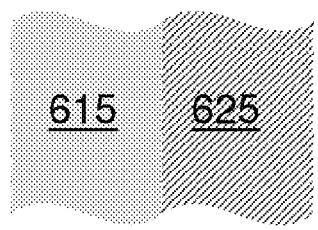
Figure 6C:
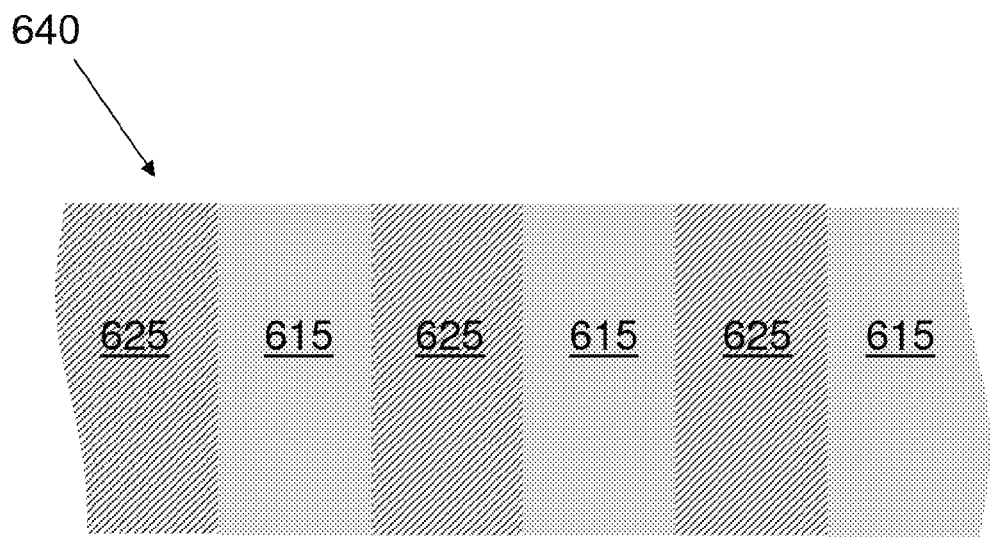

Multiple diblock polymer molecules 600 can arrange themselves to form a first domain 615 of a first phase made of the first polymer blocks 610 and a second domain 625 of a second phase made of the second polymer blocks 620, as shown in FIG. 6B. Diblock polymer molecules 600 can arrange themselves to form multiple repeat domains, thereby forming a continuous nanostructured block copolymer material 640, as shown in FIG. 6C. The sizes or widths of the domains can be adjusted by adjusting the molecular weights of each of the polymer blocks.

In one arrangement the first polymer domain 615 is ionically conductive, and the second polymer domain 625 provides mechanical strength to the nanostructured block copolymer.

Figure 7A:
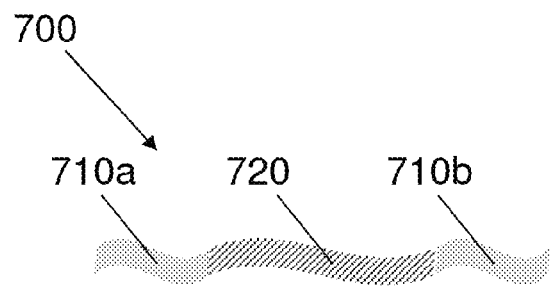
FIG. 7 is a schematic drawing of a triblock copolymer electrolyte and a domain structure it can form.

FIG. 7A is a simplified illustration of an exemplary triblock polymer molecule 700 that has a first polymer block 710a, a second polymer block 720, and a third polymer block 710b that is the same as the first polymer block 710a, all covalently bonded together. In one arrangement the first polymer block 710a, the second polymer block 720, and the third copolymer block 710b are linear polymer blocks. In another arrangement, either some or all polymer blocks 710a, 720, 710b have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 7B:
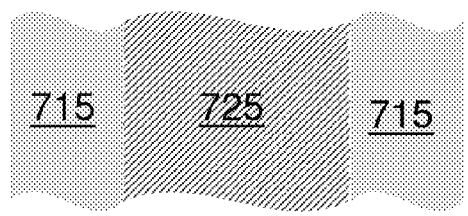
Figure 7C:
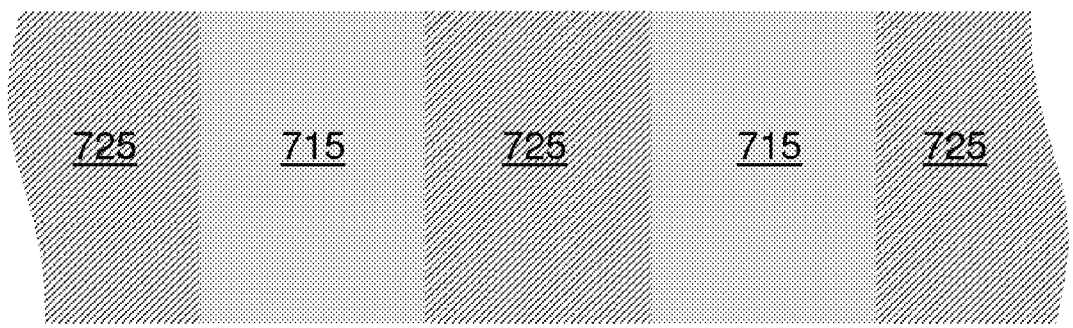

Multiple triblock polymer molecules 700 can arrange themselves to form a first domain 715 of a first phase made of the first polymer blocks 710a, a second domain 725 of a second phase made of the second polymer blocks 720, and a third domain 715b of a first phase made of the third polymer blocks 710b as shown in FIG. 7B. Triblock polymer molecules 700 can arrange themselves to form multiple repeat domains 725, 715 (containing both 715a and 715b), thereby forming a continuous nanostructured block copolymer 730, as shown in FIG. 7C. The sizes of the domains can be adjusted by adjusting the molecular weights of each of the polymer blocks.

In one arrangement the first and third polymer domains 715a, 715b are ionically conductive, and the second polymer domain 725 provides mechanical strength to the nanostructured block copolymer. In another arrangement, the second polymer domain 725 is ionically conductive, and the first and third polymer domains 715 provide a structural framework.

Figure 8A:
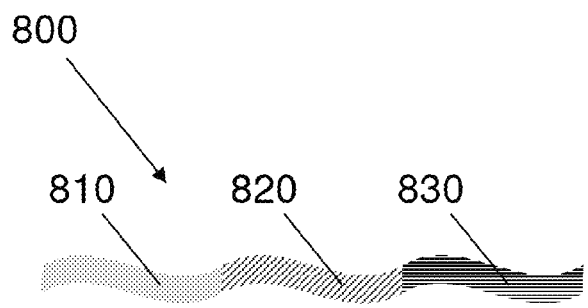
FIG. 8 is a schematic drawing of another triblock copolymer electrolyte and a domain structure it can form.

FIG. 8A is a simplified illustration of another exemplary triblock polymer molecule 800 that has a first polymer block 810, a second polymer block 820, and a third polymer block 830, different from either of the other two polymer blocks, all covalently bonded together. In one arrangement the first polymer block 810, the second polymer block 820, and the third copolymer block 830 are linear polymer blocks. In another arrangement, either some or all polymer blocks 810, 820, 830 have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 8B:
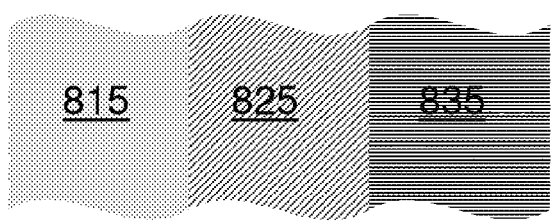
Figure 8C:
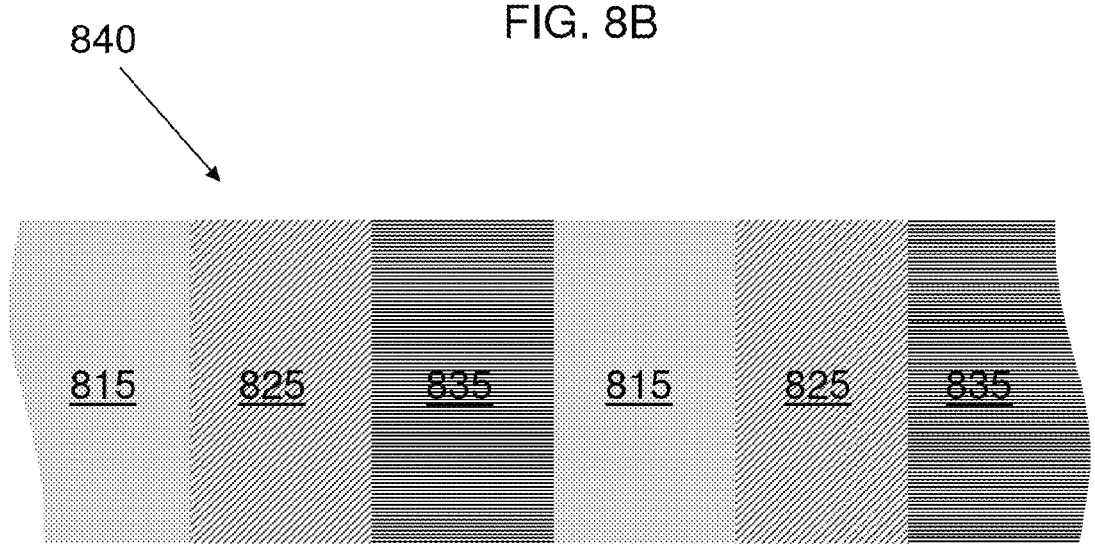

Multiple triblock polymer molecules 800 can arrange themselves to form a first domain 815 of a first phase made of the first polymer blocks 810a, a second domain 825 of a second phase made of the second polymer blocks 820, and a third domain 835 of a third phase made of the third polymer blocks 830 as shown in FIG. 8B. Triblock polymer molecules 800 can arrange themselves to form multiple repeat domains, thereby forming a continuous nanostructured block copolymer 840, as shown in FIG. 8C. The sizes of the domains can be adjusted by adjusting the molecular weights of each of the polymer blocks.

In one arrangement the first polymer domains 815 are ionically conductive, and the second polymer domains 825 provide mechanical strength to the nanostructured block copolymer. The third polymer domains 835 provides an additional functionality that may improve mechanical strength, ionic conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a modulus in excess of $1 \times 10^5$ Pa at electrochemical cell operating temperatures. In one embodiment, the third polymer (1) is rubbery; and (2) has a glass transition temperature lower than operating and processing temperatures. It is useful if all materials are mutually immiscible.

In one embodiment of the invention, the conductive phase can be made of a linear or branched polymer. Conductive linear or branched polymers that can be used in the conductive phase include, but are not limited to, polyethers, polyamines, polyimides, polyamides, alkyl carbonates, polynitriles, and combinations thereof. The conductive linear or branched polymers can also be used in combination with polysiloxanes, polyphosphazines, polyolefins, and/or polydienes to form the conductive phase.

In another exemplary embodiment, the conductive phase is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Further details about polymers that can be used in the conductive phase can be found in U.S. Provisional Patent Application No. 61/056,688, filed May 28, 2008, U.S. Provisional Patent Application No. 61/091,626, filed Aug. 25, 2008, U.S. Provisional Patent Application No. 61/145,518 filed Jan. 16, 2009, U.S. Provisional Patent Application No. 61/145,507, filed Jan. 16, 2009, U.S. Provisional Patent Application No. 61/158,257 filed Mar. 6, 2009, and U.S. Provisional Patent Application No. 61/158,241, filed Mar. 6, 2009, all of which are included by reference herein.

Further details about polymers that can be used in the conductive phase can be found in International Patent Application Number PCT/US09/45356, filed May 27, 2009, International Patent Application Number PCT/US09/54709, filed Aug. 22, 2009, U.S. Provisional Patent Application No. 61/145,518, filed Jan. 16, 2009, U.S. Provisional Patent Application No. 61/145,507, filed Jan. 16, 2009, U.S. Provisional Patent Application No. 61/158,257, filed Mar. 6, 2009, and U.S. Provisional Patent Application No. 61/158,241, filed Mar. 6, 2009, all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof. Non-lithium salts such as other alkali metal salts or salts of aluminum, sodium, or magnesium can also be used.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, such as polyvinylidene fluoride, or copolymers that contain styrene, methacrylate, or vinylpyridine.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

Further details about block copolymer electrolytes are described in U.S. patent application Ser. No. 12/225,934, filed Oct. 1, 2008, U.S. patent application Ser. No. 12/271,1828, filed Nov. 14, 2008, and International Patent Application Number PCT/US09/31356, filed Jan. 16, 2009, all of which are included by reference herein.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A dual-layer electrode assembly, consisting of:
   a first layer consisting of a network of electrode active material particles, a plurality of pores, a binder that is a first solid polymer electrolyte, an alkali metal salt, and optionally electronically conductive particles;
   a second layer comprising a second solid polymer electrolyte and an alkali metal salt, the second layer adjacent to the first layer;
   wherein at least some of the pores in the first layer contain the second solid polymer electrolyte.

2. The assembly of claim 1 wherein the first solid polymer electrolyte and the second polymer electrolyte are not the same electrolyte.

3. The assembly of claim 1 wherein a major portion of the pores in the first layer contain the second solid polymer electrolyte.

4. The assembly of claim 1 wherein the first layer has a porosity less than about 10%.

5. The assembly of claim 1 wherein the first layer has a porosity less than about 5%.

6. The assembly of claim 1 wherein the first layer has a porosity less than about 1%.

7. The assembly of claim 1 wherein the first solid polymer electrolyte and the second solid polymer electrolyte are each selected independently from the group consisting of optionally cross-linked polyethylene oxide, polysulfone, polyacrylonitrile, siloxane, polyether, polyamine, linear copolymers containing ethers or amines, ethylene carbonate, Nafion®, polysiloxane grafted with small molecules or oligomers that include polyethers and/or alkylcarbonates, and block copolymers.

8. The assembly of claim 7 wherein the block copolymer is either a diblock copolymer or a triblock copolymer.

9. The assembly of claim 8 wherein a first block of the block copolymer is ionically conductive and is selected from the group consisting of polyethers, polyamines, polyimides, polyamides, alkyl carbonates, polynitriles, polysiloxanes, polyphosphazines, polyolefins, polydienes, and combinations thereof.

10. The assembly of claim 8 wherein a first block of the block copolymer comprises an ionically-conductive comb polymer, which comb polymer comprises a backbone and pendant groups.

11. The assembly of claim 10 wherein the backbone comprises one or more selected from the group consisting of polysiloxanes, polyphosphazines, polyethers, polydienes, polyolefins, polyacrylates, polymethacrylates, and combinations thereof.

12. The assembly of claim 10 wherein the pendants comprise one or more selected from the group consisting of oligoethers, substituted oligoethers, nitrile groups, sulfones, thiols, polyethers, polyamines, polyimides, polyamides, alkyl carbonates, polynitriles, other polar groups, and combinations thereof.

13. The assembly of claim 8 wherein a second block of the block copolymer is selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, polyvinylidene fluoride, and copolymers that contain styrene, methacrylate, and/or vinylpyridine.

14. The assembly of claim 1, wherein the alkalai metal salt is a lithium salt.

15. The assembly of claim 1 wherein the first layer is a negative electrode.

16. The assembly of claim 1 wherein the first layer is a positive electrode.

17. The assembly of claim 1 wherein the first layer has a thickness between about 5 and 40 µm.

18. The assembly of claim 1 wherein the second layer has a thickness between about 5 and 40 µm.

19. The assembly of claim 1 wherein neither the first solid polymer electrolyte nor the second solid polymer electrolyte is cross-linked.

20. An electrode assembly, consisting of:
   a first layer consisting of a network of electrode active material particles, a plurality of pores, a binder that is a first solid polymer electrolyte, an alkali metal salt, and optionally electronically conductive particles; and
   a second layer adjacent to the first layer, the second layer comprising a second solid polymer electrolyte and an alkali metal salt;
   wherein along the interface between the first layer and the second layer, there are pockets of the second solid polymer electrolyte in the first layer.

21. A battery cell, comprising:
   a) a dual-layer cathode assembly, consisting of:
      a first cathode assembly layer consisting of a network of cathode active material particles, a plurality of pores, a binder that is a first solid polymer electrolyte, an alkali metal salt, and optionally electronically conductive particles; and
      a second cathode assembly layer adjacent to the first cathode assembly layer, the second cathode assembly layer comprising a second solid polymer electrolyte and an alkali metal salt;
      wherein along the interface between the first cathode assembly layer and the second cathode assembly layer, there are pockets of the second solid polymer electrolyte in the first cathode assembly layer; and
   b) a dual-layer anode assembly, comprising:
      a first anode assembly layer comprising anode active material particles a third solid polymer binder, and a plurality of pores; and
      a second anode assembly layer comprising a fourth solid polymer electrolyte adjacent to the first anode assembly layer;

wherein the second cathode assembly layer and the second anode assembly layer are in ionic communication with one another.

22. The battery cell of claim 21 wherein the fourth solid polymer electrolyte permeates a thin region of the first anode assembly layer adjacent the second anode assembly layer.

23. The battery cell of claim 21 wherein the first solid polymer electrolyte, the second polymer electrolyte, the third solid polymer electrolyte, and the fourth solid polymer electrolyte are each selected independently from three different electrolytes.

24. The battery cell of claim 21 wherein the first solid polymer electrolyte, the second polymer electrolyte, the third solid polymer electrolyte, and the fourth solid polymer electrolyte are each selected independently from two different electrolytes.

25. The battery cell of claim 21 wherein the first solid polymer electrolyte, the second polymer electrolyte, the third solid polymer electrolyte, and the fourth solid polymer electrolyte each comprises a different polymer electrolyte.

26. A battery cell, comprising:
a) a dual layer cathode assembly, consisting of:
 a first layer consisting of a network of cathode active material particles, a plurality of pores, a binder that is a first solid polymer electrolyte, an alkali metal salt, and optionally electronically conductive particles;
 wherein the first layer has a porosity less than about 5%; and
 a second layer adjacent to the first layer, the second layer consisting of a second solid polymer electrolyte and an alkali metal salt;
 wherein along the interface between the first layer and the second layer, there are pockets of the second solid polymer electrolyte in the first layer; and
b) an anode layer;
wherein the second cathode assembly layer and the anode layer are in ionic communication with one another.

* * * * *